US012634628B2

(12) United States Patent
Wei et al.

(10) Patent No.: US 12,634,628 B2
(45) Date of Patent: May 19, 2026

(54) GLASS DIAPHRAGM HAVING FUNCTIONAL LAYERS AND SPEAKER HAVING THE SAME

(71) Applicant: Glass Acoustic Innovations Co., Ltd., New Taipei City (TW)

(72) Inventors: Yi-Feng Wei, New Taipei City (TW); Kwun-Kit Chan, New Taipei City (TW); Yao-Sheng Chou, New Taipei City (TW)

(73) Assignee: Glass Acoustic Innovations Co., Ltd., New Taipei City (TW)

( * ) Notice: Subject to any disclaimer, the term of this patent is extended or adjusted under 35 U.S.C. 154(b) by 221 days.

(21) Appl. No.: 18/217,532

(22) Filed: Jul. 1, 2023

(65) Prior Publication Data

US 2024/0373166 A1    Nov. 7, 2024

(30) Foreign Application Priority Data

May 6, 2023    (CN) .......................... 202310503778.3

(51) Int. Cl.
| | |
|---|---|
| *H04R 7/02* | (2006.01) |
| *C03C 17/00* | (2006.01) |
| *C03C 17/32* | (2006.01) |
| *C03C 17/42* | (2006.01) |
| *H04R 9/06* | (2006.01) |

(52) U.S. Cl.
CPC ............. *H04R 7/02* (2013.01); *C03C 17/001* (2013.01); *C03C 17/322* (2013.01); *C03C 17/42* (2013.01); *H04R 9/063* (2013.01)

(58) Field of Classification Search
CPC .......... H04R 7/02; H04R 9/063; H04R 9/047;

H04R 9/06; H04R 2307/023; H04R 2307/025; H04R 7/10; H04R 9/025; H04R 2400/11; C03C 17/001; C03C 17/322; C03C 17/42; C03C 2218/112; C03C 2218/119; C03C 17/32
USPC ......................................... 181/167, 157, 170
See application file for complete search history.

(56) References Cited

U.S. PATENT DOCUMENTS

| | | | |
|---|---|---|---|
| 8,447,063 B2 * | 5/2013 | Chu ...................... | H04R 1/2834 |
| | | | 381/396 |
| 9,894,442 B2 * | 2/2018 | Salvatti .................... | H04R 9/06 |
| 10,009,683 B2 * | 6/2018 | Choi ...................... | H04R 1/028 |

(Continued)

FOREIGN PATENT DOCUMENTS

| | | | |
|---|---|---|---|
| CN | 202310503778.3 | 11/2024 | |
| WO | WO-2022183801 A1 * | 9/2022 | ............. H04R 9/046 |

OTHER PUBLICATIONS

Machine Translation of WO-2022183801-A1 (Year: 2022).*

*Primary Examiner* — Forrest M Phillips
*Assistant Examiner* — Jennifer B Olson
(74) *Attorney, Agent, or Firm* — Chih Feng Yeh; Yongjean Consulting Inc

(57) ABSTRACT

The present invention discloses a glass diaphragm having a functional layer which is selected from one of the following group or the combination thereof: explosion-proof layer, decorative layer, waterproof layer, and anti-reflection layer. The anti-explosion layer is made of PU, PVB, PC, PET or PMMA, the decorative layer contains ink materials, and the anti-reflection layer includes porous or raised structures formed by nanometer materials. The functional layer is formed by coating, spraying, pasting, ink jetting, coating.

14 Claims, 2 Drawing Sheets

(56)         References Cited

U.S. PATENT DOCUMENTS

| 10,484,794 | B2 * | 11/2019 | Itano | H04R 7/12 |
|---|---|---|---|---|
| 11,513,758 | B2 * | 11/2022 | Won | G06F 1/1637 |
| 11,856,381 | B2 * | 12/2023 | Akiyama | H04R 7/18 |
| 2015/0166795 | A1 * | 6/2015 | Kalyankar | C09D 5/006 |
| | | | | 427/164 |
| 2019/0208329 | A1 * | 7/2019 | King | H10N 30/704 |
| 2022/0217470 | A1 * | 7/2022 | Akiyama | H04R 7/08 |
| 2022/0396207 | A1 * | 12/2022 | Cannon | H04R 7/045 |

* cited by examiner

GLASS DIAPHRAGM HAVING FUNCTIONAL LAYERS AND SPEAKER HAVING THE SAME

CROSS REFERENCE STATEMENT

The present application is based on, and claims priority from, China Patent Application Serial Number 202310503778.3, filed May 6, 2023, the disclosure of which is hereby incorporated by reference herein in its entirety.

TECHNICAL FIELD

The present invention relates to a loudspeaker diaphragm, particularly to a glass diaphragm with a functional layer or film.

BACKGROUND

Loudspeakers may convert electronic signals to sounds, and a sound system typically includes one or more speakers. With the development of science and technology, speakers are embedded in various electronic devices. The speaker is composed of magnets, voice coils, and a diaphragm, etc. An electromagnetic field is generated when the current passes through the voice coils, the interaction makes the speaker diaphragm vibrate to push the surrounding air, thereby producing sound by the vibration. The major function of the speaker is to convert the electrical signal into sound.

Human may detect the sound frequency between 20 Hz to 20,000 Hz, typically, the general loudspeaker response will be set within this range. The conversion process includes steps of converting electrical, magnetic energy to mechanical energy, and finally, the mechanical energy is converted to sound. In the prior art, if a traditional loudspeaker requires better sound effects, the loudspeaker is larger and occupies space. If the loudspeaker is too small, it cannot offer better sound effects.

In an electronic device, the speaker is usually arranged in the corner area of the display panel, it is unlikely to achieve better listening experience by the arrangement. At present, the modem electronic devices are full-screen designs, leaving less and less space for the speakers. The vibration system includes the sound diaphragm, that is, the speaker diaphragm, which can be made of various materials. The material and the manufacture process of the diaphragm determine the sound quality of the speaker, mostly. According to different materials, the diaphragm can be divided into the following types. Paper is a common diaphragm material, the paper diaphragm is the most mature, and the sound characteristics of the paper are smooth and natural. The paper diaphragm is light in weight and has high energy conversion efficiency. Due to the paper interweaving fibers, the energy can be quickly absorbed during the transmission process, so the damping characteristics of the paper cones are relatively ideal. However, due to the characteristics of the material, the paper cone is sensitive to the temperature and humidity, and the environment changes may affect the performance of the paper cone. The plastic diaphragm is generally made of polypropylene material, it is referred to as PP cone. Compared with paper cones, PP cones are much better in terms of moisture-proof and waterproof effects. The PP cone also has excellent damping characteristics, and the sound is soft and natural. In terms of disadvantages, the rigidity of the PP cone is average, and it is not suitable for expressing high-frequency sound. It is prone to sound distortion. The metal diaphragm has distinct characteristics. It is generally made of aluminum or aluminum alloy which is stable and light in weight compared to other metals. The metal diaphragm has excellent rigidity, it has excellent dynamic performance, but the metal diaphragm is heavy and the damping characteristics are poor, it is not easy to drive the sound unit.

Traditional planar speakers have planar voice coils and magnets provided on one or both sides of the diaphragm, and the magnetic-electrical interaction causes the diaphragm vibration. The electrical signal is connected to the printed circuit and the current is perpendicular to the magnetic field generated by the magnet, a force that obeys Faraday's law is generated. Under the interaction of this force, the diaphragm vibrates, and therefore, converts the AC current signal into a sound signal. For example, U.S. Pat. No. 8,447,063 B2 discloses a planar thin dynamic loudspeaker, which is configured so that the driving unit and the suspension unit are on the same plane, it is beneficial to reduce the thickness of the loudspeaker. However, such designs are outdated diaphragm technologies.

No matter what kind of the diaphragm it is, there are disadvantages and shortcomings. Therefore, what is required is to integrate the planar speaker and the planar display.

SUMMARY OF THE INVENTION

Based on the above-mentioned, the present invention discloses a glass diaphragm speaker having functional layer, the glass diaphragm speaker includes magnets. Voice coils are formed adjacent to the magnets. A glass diaphragm is formed adjacent to the voice coils; and a functional layer formed on a surface of the glass diaphragm, wherein the functional layer is selected from one or the combination thereof: explosion-proof layer, decorative layer, waterproof layer, and anti-reflection layer. The explosion-proof layer is made of PU, PVB, PC, PET or PMMA, the decorative layer includes ink. The functional layer is formed by coating, spraying, laminating, or inkjet procedure, wherein the anti-reflection layer includes nano-meter material having porous or protruding structures. The glass diaphragm speaker further comprises a composite material formed on the glass diaphragm to enhance sound quality.

According to another aspect of the present invention, a functional layer glass diaphragm comprises a glass diaphragm formed adjacent to the voice coils; and a functional layer formed on a surface of the glass diaphragm, wherein the functional layer is selected from one or the combination thereof: explosion-proof layer, decorative layer, waterproof layer, and anti-reflection layer. The explosion-proof layer is formed by PU, PVB, PC, PET or PMMA. The decorative layer includes ink, and the functional layer is formed by coating, spraying, laminating, or inkjet procedure. The anti-reflection layer includes nano-meter material having porous or raised structures. Preferably, the glass diaphragm further comprises a composite material formed on the glass diaphragm to enhance sound quality. COG (Chip on Glass) technology is applied to the present invention to integrate chip or IC on the glass substrate.

DETAILED DESCRIPTION

Figure 1:
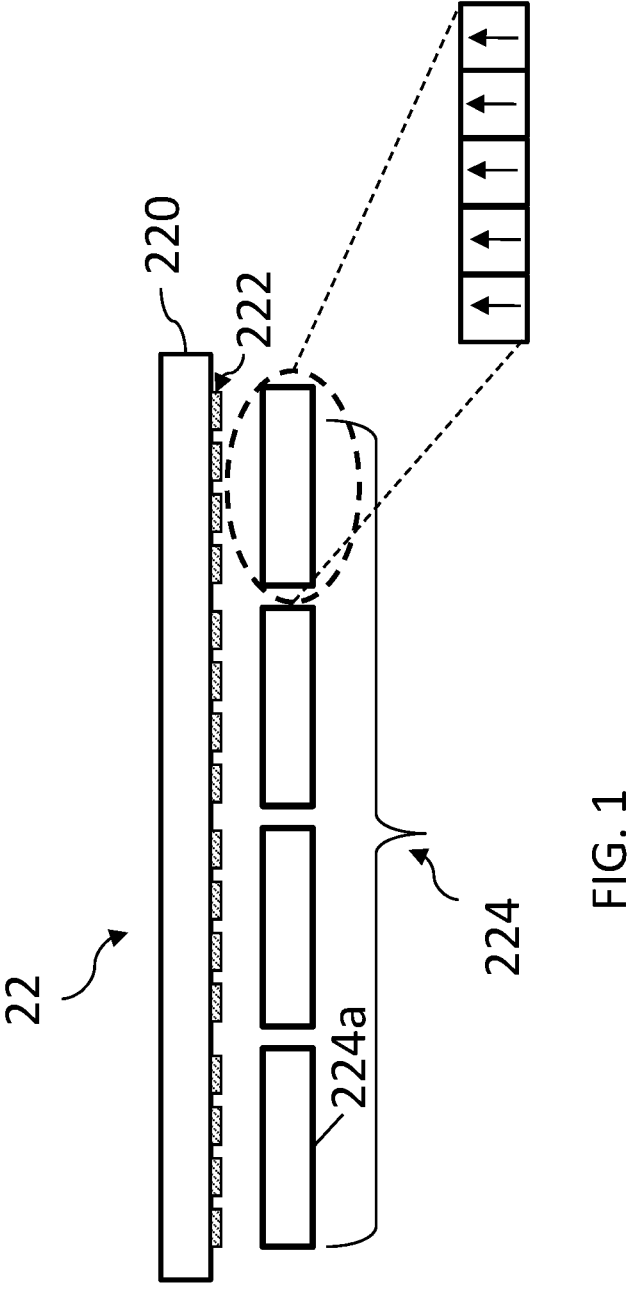
FIG. 1 shows one embodiment of the present invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention discloses a glass diaphragm which is adapted to general speakers or flat panel displays. For the convenience of illustration, the preferred embodiments are described below, but the description is not intended to limit the present invention.

The glass diaphragm has many advantages, such as higher electric/acoustic conversion efficiency, because of higher mechanical strength, and smaller density. The frequency range of the glass diaphragm is wider, the sound distortion is small at low frequencies, and the sound quality is better. The displays of many electronic devices are made of glass, therefore, the present invention integrates the sounding unit with the planar display, and the glass of the planar display acts as a speaker diaphragm. Alternatively, the glass diaphragm speaker may be separated from the display, it still falls within the concept of the present invention.

The present invention can be applied to a planar multimedia device which includes a processor, a communication device, and a microphone electrically connected to a noise reduction device. The planar multimedia device includes a storage medium, a display and a glass diaphragm speaker, and is electrically connected to a processor. The noise reduction device is used to suppress or eliminate the noise generated by various noise sources. For example, the noise reduction device can eliminate the noise through the noise filter, the means is to generate a signal that is inverse to the noise waveform, and the superposition of the two waveforms generate destructive interference to suppress or eliminate the decibel value (dB value) of the noise source, to achieve purpose of noise reduction. The microphone is usually electrically coupled to the noise reduction device for receiving the noise generated by the noise source. In one embodiment, the communication device communicates with external device through a wireless network, and the wireless protocol includes Bluetooth, WiFi or 5G. In one embodiment, the application program of the planar multimedia device is connected to the external device through the communication device. The user downloads or streams the audio/video through the communication device, and plays them on the display and the glass diaphragm speaker of the planar multimedia device. In one embodiment, the display of the planar multimedia device has a touch panel configured on the display. Video call is possible to be achieved via the communication device, so as to facilitate remote sharing.

In one embodiment, FIG. 1 shows a cross-sectional view of a planar glass diaphragm speaker 22. As shown in the figure, glass is employed as a diaphragm, namely, a glass diaphragm 220, alternatively, glass acts as a diaphragm for an independent speaker, or a glass of a planar display. The following embodiment uses a planar display as an example for illustration. On the non-display side surface of the display, a planar voice coil 222 is fabricated by printing, coating or photolithography, and a magnet assembly 224 is placed under the glass diaphragm to create a magnetic field. The glass diaphragm 220 is vibration under the interaction of the magnetic field and, thereby propagating sound. The planar voice coil 222 is electrically connected to the electric signal of the sound source, and the magnet assembly 224 arranged under the voice coil 222. The configuration plays the role of an actuator to drive the glass diaphragm 220. The magnet assembly 224 includes plurality of magnet units 224a. The current of the planar voice coil 222 is perpendicular to the magnetic field generated by the magnet assembly 224. Through the alternating current flowing in the planar voice coil 222, a force under Faraday's law is generated. Under the interaction with this force, the glass diaphragm 220 vertically vibrates, thereby propagating sound.

Figure 2:
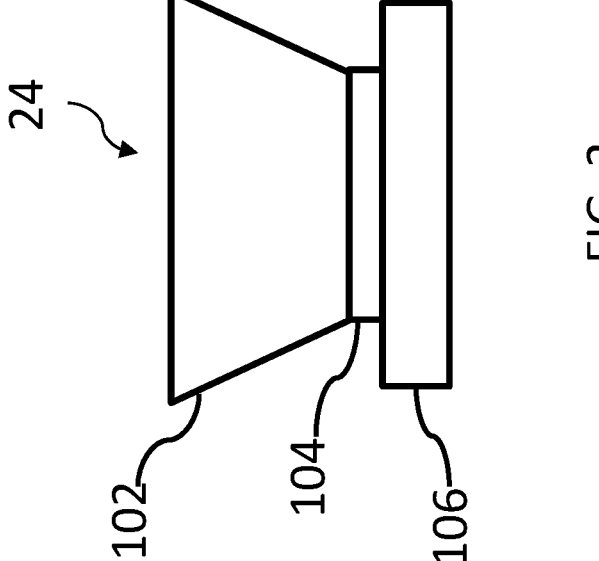
FIG. 2 shows another embodiment of the present invention.

In one embodiment, the display panel includes, but not limited to, LCD, mini-LED or OLED. The magnetic direction is shown in in FIG. 1, alternatively, the magnet unit 224 can be a Halbach Array configuration. It enhances the magnetic field strength per unit and generates the strongest magnetic field with a minimum number of magnets. The array is composed of rare-earth permanent magnet materials. By Halbach Array arrangement, the magnetic field at the top of the magnet is stronger, while the bottom is relatively weak. The magnetic field lines are gathered on one side of the magnets and weakened on the other side. Therefore, an ideal unilateral magnetic field is achieved. Another embodiment is a non-planar glass diaphragm speaker 24 as shown in FIG. 2, it includes a glass diaphragm 102, a non-planar voice coil 104 and a magnet 106. Either the voice coils 222 or the voice coils 104 are conductive lines that are made of silver (Ag), indium tin oxide (Indium Tin Oxide, ITO), indium zinc oxide (Indium Zinc Oxide, IZO), indium gallium zinc oxide (Indium Gallium Zinc Oxide, IGZO).

If the display of the planar multimedia device employs such as liquid crystal display, mini light-emitting diodes or organic light-emitting diodes display. The glass diaphragm speaker 22 utilizes the glass substrate of the display panel as a vibrating body (diaphragm), and a planar voice coil 222 is made on the glass surface of the non-display side of the display panel, and a magnet assembly 224 is arranged under the glass diaphragm 220 to generate a magnetic field. The planar voice coil 222 may be integrated into the flexible circuit board, the drive IC, and other components such as D/A converter, digital signal processor, audio signal output, and video signal output are formed on the circuit board, maybe electrically connected to the display panel to provide audio/video signals. Based on the above-mentioned scope of the present invention, the planar voice coils 222 may have the shape of concentric circles or athletic track, so as to adapt to different application domains.

Since the sound is generated by the vibration of the glass diaphragm 220, in the embodiment shown in FIG. 2, an independent speaker or loudspeaker is shown. In the present invention, after the temperature is raised to molding temperature of the glass material, it is pressed into the required shape by molding process with upper and lower molds. According to one embodiment of the invention, the diaphragm is pressed as a conical, planar or spherical shape The characteristics of the diaphragm made of strengthened glass are high electroacoustic conversion efficiency (because of its high mechanical strength, low density), wider frequency range (because of its rigidity, and small distortion at low frequencies), and good sound quality.

According to an embodiment of the present invention, the surface of the glass diaphragm 220 or 102 is subjected to functional processing to achieve the purpose of anti-glare, explosion-proof, strengthening and the like.

From an explosion-proof aspect, the surface of the glass diaphragm 220 or 102 includes an explosion-proof layer and an insulating layer attached thereto, the explosion-proof layer is formed on the surface of the glass diaphragm 220 or 102, and the insulating layer is arranged on the surface of the explosion-proof layer. The explosion-proof layer has high adhesion and high toughness characteristics. For example, polyvinyl butyral resin (PVB) is introduced, the explosion-proof layer absorbs the shock and vibration, and improves the strength of the glass, thereby prevent the glass from being penetrated. The insulating layer is a waterproof layer to avoid small amount of water contained in the explosion-proof layer for maintaining the physical properties of the glass diaphragm 220. In addition, the insulating layer may also block external liquids at the same time. The explosion-proof glass achieves high strength and explosion-proof performance, and the overall thickness is thinner and the weight is lighter. When the explosion-proof glass is hit, the glass fragments produced on the surface will be blocked and adhered by the high-toughness explosion-proof layer, and will not fly into the surrounding and any injury will be avoided.

In a preferred embodiment, when the PVB layer is used as explosion-proof layer, the PVB is likely to combine with inorganic material, the PVB layer is able to adhere with the glass layer to achieve the shock absorbing performances. In one embodiment, the anti-explosion layer is a composite film of PET or aluminized PET with a thickness of at least 0.05 mm to prevent explosion. In another embodiment, the anti-explosion layer is made of PC, PET or PMMA. The explosion-proof layer and insulating layer can be formed by coating, spraying, bonding, coating, etc. In addition, other composite materials may be laminated with the glass to enhance the sound quality.

From the anti-glare aspect, in a preferred embodiment, an anti-reflection layer is selected. The anti-reflection layer involves the principle of interference of the reflected light when the light passes through the anti-reflective layer. The light reflected by the surface of the glass layer is reduced by the anti-reflection layer. The anti-reflection film can be formed by coating, sputtering, bonding, coating and other methods.

From the appearance aspect, the glass diaphragm of the present invention may optionally include a decorative layer, and the decorative layer is arranged between the surface of the glass layer and the explosion-proof layer. It is preferable to introduce inorganic ink for the decorative layer. The ink layer forms specific colors, patterns or textures over the glass to achieve good product appearance. In order to achieve the purpose of above, the decoration layer is arranged under or above the explosion-proof layer, and the decoration layer provides desired color, pattern or texture.

The present invention provides an explosion-proof display panel, it includes a glass diaphragm, an explosion-proof layer, and an insulating layer formed in sequence. Preferably, an anti-reflection layer is optionally formed to reduce reflected light and prevent the disturbed light. Preferably, the anti-reflection layer is formed by using nanometer materials which have porous structure, low refractive index characteristics. For example, PET material is used to make bionic nano-cones. In another embodiment, titanium dioxide and silicon dioxide are used, and the surface is formed uniformly by inkjet and spray coating to achieve anti-reflection and anti-glare effects.

In one embodiment, a decorative layer is disposed between the glass surface and the explosion-proof layer. The manufacturing method of the colored explosion-proof layer of the present invention includes steps of forming a colloidal film on a substrate, and the colloidal film is mixed with ink materials. The glue can be evenly sprayed on the substrate by spraying method or inkjet method. The thickness of the explosion-proof film is controlled between 5-500 microns, and the colloid material can be selected from one of the following silicone-based adhesive materials, acrylic-based adhesive materials, polyurethane (PU)-based adhesive materials, and colloid mixed with ink, the explosion-proof layer has desired color after curing. Subsequently, the colloidal film is hardened to form the explosion-proof layer, and the hardening method can be selected from one of the following methods: light curing, heat curing, and light-heat curing. Optical-grade materials are uniformly formed by coating machines, spraying machines, and laminating machines. Through above technical means and methods, the physical function of the glass diaphragm is strengthened, and desired color or texture is achieved. The present invention can not only achieve the explosion-proof effect, but also enhance the visual effect of the product.

From another point of view, the glass diaphragm speaker is disturbed by water vapor, therefore, the shell structure of the present invention has waterproof characteristics. In one embodiment, the glass diaphragm speaker or the outer casing of the planar multimedia device is waterproof, for example, waterproof rubber strips and sealing rings are used as protection means. The cavity and exterior of the speaker are composed of filter layer and waterproof silicone. The aperture of the filter layer is smaller than sizes of water molecules, it can prevent the water from entering. Compared with structural waterproofing, nano-waterproofing material can also be used. The waterproof membranes are coated on speakers or flat multimedia devices. The nano-coatings has very small porosity, it is impossible for water to pass, and the water condenses into water droplets. The waterproof performance will be improved by coating nanometer materials on parts of the casing.

From another point of view, the present invention is based on glass as a diaphragm, the present invention can manufacture chip or ICs on the glass diaphragm during the manufacturing process, namely, COG (Chip on Glass) technology is applied to the present invention to integrate chip or IC on the substrate. For example, Flip chip technology is used to bond the IC or chip to the glass substrate. The above chip or IC is a sensing chip or a driving IC. The thickness of the COG structure is thin enough to meet the requirements of light product trend. The COG technology enables the chip to be directly bound on the glass surface, which can greatly reduce the volume, simplify the manufacturing and facilitate mass production. The present invention meets the multi-functional demands.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A glass diaphragm speaker having a functional layer comprising:

magnets;

planar voice coils formed adjacent to said magnets and on a non-display side surface of a planar display, wherein said magnets are formed in a Halbach Array configuration to enhance a magnetic field strength per unit, wherein a glass substrate of said planar display acts as a glass diaphragm, thereby forming said planar voice coils on said glass diaphragm by printing, coating or photolithography, and said magnets being placed under said glass diaphragm to create a magnetic field, said magnetic field at a top of said magnets being relatively strong, while said magnetic field at a bottom of said magnets being relatively weak, thereby gathering magnetic field lines between said magnets and said planar voice coils;

wherein said functional layer formed on a surface of said glass diaphragm, wherein said functional layer is selected from one or the combination thereof: explosion-proof layer, decorative layer, waterproof layer, and anti-reflection layer, wherein said anti-reflection layer includes nano-meter material having porous or raised structures, wherein said decorative layer includes ink.

2. The glass diaphragm speaker of claim 1, wherein said explosion-proof layer is PU, PVB, PC, PET or PMMA.

3. The glass diaphragm speaker of claim 1, wherein said the functional layer is formed by coating, spraying, laminating, or inkjet procedure.

4. The glass diaphragm speaker of claim 1, further comprising a composite material formed on said glass diaphragm to enhance sound quality.

5. The glass diaphragm of claim 1, further comprising a COG process to form a chip on said glass diaphragm.

6. A glass diaphragm speaker having a functional layer comprising:

magnets;

planar voice coils formed adjacent to said magnets and on a non-display side surface of a planar display, wherein said magnets are formed in a Halbach Array configuration to enhance a magnetic field strength per unit, wherein a glass substrate of said planar display acts as a glass diaphragm, thereby forming said planar voice coils on said glass diaphragm by printing, coating or photolithography, and said magnets being placed under said glass diaphragm to create a magnetic field, said magnetic field at a top of said magnets being relatively strong, while said magnetic field at a bottom of said magnets being relatively weak, thereby gathering magnetic field lines between said magnets and said planar voice coils;

wherein said functional layer formed on a surface of said glass diaphragm, wherein said functional layer is selected from one or the combination thereof: explosion-proof layer, decorative layer, waterproof layer, and anti-reflection layer, wherein said explosion-proof layer is PU, PVB, PC, PET or PMMA, wherein said anti-reflection layer includes nano-meter material having porous or raised structures, wherein said decorative layer includes ink.

7. The glass diaphragm speaker of claim 6, wherein said the functional layer is formed by coating, spraying, laminating, or inkjet procedure.

8. The glass diaphragm speaker of claim 6, further comprising a composite material formed on said glass diaphragm to enhance sound quality.

9. The glass diaphragm of claim 6, further comprising a COG process to form a chip on said glass diaphragm.

10. A glass diaphragm having a functional layer comprising:

said glass diaphragm formed adjacent to planar voice coils, wherein said planar voice coils are formed on a non-display side surface of a planar display, wherein a glass substrate of said planar display acting as said glass diaphragm, thereby forming said planar voice coils on said glass diaphragm by printing, coating or photolithography;

magnets arranged under said glass diaphragm to generate a magnetic field, wherein said magnets are formed in a Halbach Array configuration to enhance a magnetic field strength per unit, said magnetic field at a top of said magnets being relatively strong, while said magnetic field at a bottom of said magnets being relatively weak, thereby gathering magnetic field lines between said magnets and said planar voice coils;

said functional layer being formed on a surface of said glass diaphragm, wherein said functional layer is selected from one or the combination thereof: explosion-proof layer, decorative layer, waterproof layer, and anti-reflection layer, wherein said anti-reflection layer includes nano-meter material having porous or raised structures.

11. The glass diaphragm of claim 10, wherein said explosion-proof layer is PU, PVB, PC, PET or PMMA.

12. The glass diaphragm of claim 10, wherein said the functional layer is formed by coating, spraying, laminating, or inkjet procedure.

13. The glass diaphragm of claim 10, further comprising a composite material formed on said glass diaphragm to enhance sound quality.

14. The glass diaphragm of claim 10, further comprising a COG process to form a chip on said glass diaphragm.

* * * * *